(12) United States Patent
Yoon et al.

(10) Patent No.: US 8,260,270 B2
(45) Date of Patent: Sep. 4, 2012

(54) FEMTO BS FOR REDUCING INTER-CELL INTERFERENCE AND METHOD FOR TRANSMITTING SIGNAL USING THE SAME

(75) Inventors: Sung Guk Yoon, Seongnam-si (KR); Jong Hun Han, Seoul (KR); Sae Woong Bahk, Seoul (KR); Young Han Kim, Seoul (KR); Ik Hyeon Kim, Seoul (KR)

(73) Assignees: Foundation of Soongsil University-Industry Cooperation, Seoul (KR); MMC Technology, Inc., Seoul (KR)

( * ) Notice: Subject to any disclaimer, the term of this patent is extended or adjusted under 35 U.S.C. 154(b) by 0 days.

(21) Appl. No.: 13/028,706

(22) Filed: Feb. 16, 2011

(65) Prior Publication Data
US 2012/0122444 A1    May 17, 2012

(30) Foreign Application Priority Data
Nov. 11, 2010   (KR) .................. 10-2010-0111897

(51) Int. Cl.
*H04M 3/42* (2006.01)
*H04W 4/00* (2009.01)

(52) U.S. Cl. ............... 455/414.1; 455/422.1; 455/456.1
(58) Field of Classification Search ............. 455/414.1, 455/3.01, 436, 456.1, 407, 411, 456.3, 425, 455/422.1, 517, 450, 458, 414.2, 435.2; 370/328, 370/336, 329, 241, 338; 709/220, 224
See application file for complete search history.

(56) References Cited

U.S. PATENT DOCUMENTS

| | | | |
|---|---|---|---|
| 2006/0094408 A1* | 5/2006 | Hu et al. | 455/414.1 |
| 2010/0309849 A1* | 12/2010 | Park et al. | 370/328 |
| 2010/0323610 A1* | 12/2010 | Li et al. | 455/3.01 |

* cited by examiner

*Primary Examiner* — Kiet Doan
(74) *Attorney, Agent, or Firm* — Maschoff Filmore & Israelsen

(57) ABSTRACT

A signal transmission method includes determining whether there is a User Equipment (UE) within an area of the femto BS, determining whether the UE is in an active mode, operating in a first mode of alternating a first Available Interval (AI) with a first UnAvailable Interval (UAI) in time, if no UE exists within the area of the femto BS, operating in a second mode of alternating a second AI with a second UAI shorter than the first UAI in time, if a UE exists within the area of the femto BS and operates in an inactive mode and operating in a third mode of continuously transmitting a signal, if a UE exists within the area of the femto BS and operates in the active mode.

6 Claims, 8 Drawing Sheets

FEMTO BS FOR REDUCING INTER-CELL INTERFERENCE AND METHOD FOR TRANSMITTING SIGNAL USING THE SAME

CROSS REFERENCE TO RELATED APPLICATIONS

This application claims the benefit of Korean Patent Application No. 10-2010-0111897, filed on Nov. 11, 2010, which is hereby incorporated by reference as if fully set forth herein.

BACKGROUND OF THE INVENTION

1. Field of the Invention

The present invention relates to a femto Base Station (BS) for reducing Inter-Cell Interference (ICI) and a method for transmitting a signal using the same.

2. Discussion of the Related Art

Traditional cellular systems have been developed along two major axes, 3rd Generation Partnership Project (3GPP) based on Global System for Mobile communications (GSM) and 3GPP2 based on Code Division Multiple Access (CDMA). Recently, the Worldwide Interoperability for Microwave Access (WiMAX) camp has joined the development. The most critical factor for cellular wireless communications is high-speed throughput. The recent soaring increase in wireless communication throughput is attributed to the increase of Signal-to-Interference and Noise Ratio (SINR) as a result of scaling down a cell size.

One of up-to-date technologies that increase SINR through cell size reduction is femtocell. The term 'femtocell' generically refers to an ultra small BS covering tens of meters which a user can install at home or in an office, the resulting ultra small cell, and associated technologies. An ultra small BS for a femtocell may be referred to as a femto BS, a femto Access Point (AP), a femto Advanced BS (ABS), a femtocell BS, or a femtocell. Herein, such an ultra small BS is referred to as a femto BS or a femtocell BS. In contrast, a conventional BS having a wide coverage may be referred to as a macro BS or a macrocell BS.

A femto BS may be installed in a shadowing area that a macro BS cannot cover. The femto BS is a small-size version of a macro BS, capable of carrying out most of the functions of the macro BS. The femto BS has a network configuration that operates independently. It is expected that far more femto BSs than relay BSs will be installed downtown or indoors. Accordingly, a neighbor BS list that a BS transmits to a User Equipment (UE) does not contain a femto BS list because the femto BS list has too large an amount of information.

FIG. 1 illustrates the configuration of a wireless communication system to which a femtocell BS is added.

Referring to FIG. 1, the wireless communication system includes a femtocell BS 110, a macrocell BS 120, a Femto Network Gateway (FNG) 130, an Access Service Network (ASN) 140, and a Connectivity Service Network (CSN) 150. The macrocell BS 120 is a general BS in a conventional wireless communication system.

The femtocell BS 110 is connected directly to a Transmission Control Protocol/Internet Protocol (TCP/IP) network and operates independently, like the macrocell BS 120. The femtocell BS 110 has a coverage of 0.1 to 30 m and accommodates 10 to 20 MSs. The femtocell BS 110 may operate at the same frequency as or a different frequency from the macrocell BS 120.

The femtocell BS 110 may be connected to the macrocell BS 120 via an R1 interface and thus may receive a downlink channel from the macrocell BS 120 or transmit a control signal to the macrocell BS 120 via the R1 interface.

The femtocell BS 110 may cover an indoor area or shadowing area that the macrocell BS 120 cannot afford to cover and may support high-speed data transmission. The femtocell BS 110 may be overlaid within the macrocell of the macrocell BS 120 or installed outside the coverage of the macrocell BS 120 in a non-overlay fashion.

There are two types of femto BSs, Closed Subscriber Group (CSG) femto BSs and Open Subscriber Group (OSG) femto BSs. A CSG femto BS groups MSs that can access the CSG femto BS and assigns a CSG Identification (ID) to the MSs. Thus only the MSs having the CSG ID can access the CSG femto BS. On the other hand, an OSG femto BS is accessible to all MSs. A hybrid femto BS type may further be defined by combining the features of a CSG femto BS with the features of an OSG femto BS.

The FNG 130, a gateway that controls the femto BS 110, is connected to the ASN 140 and the CSN 150 via an Rx interface and an Ry interface, respectively. The femto BS 110 may receive a service from the CSN 150 through the FNG 130 and a Mobile Station (MS) connected to the femto BS 110 may receive services such as authentication, IP Multimedia Subsystem (IMS) service, etc. from the FNG 130 or the CSN 150. The CSN 150 provides connectivity of application services such as Internet, Voice over Internet Protocol (VoIP), etc. and authentication and billing functions to MSs. The ASN 140 controls the macrocell BS 120 and manages connection between the macrocell BS 120 and the CSN 150.

It is anticipated that interference will get more severe than in a conventional environment, in a femtocell environment. One reason for the increased interference is that interference factors increase in number due to interference from femtocells in addition to interference between macrocells. Another reason is that a large number of femtocell BSs will be installed on a user basis, compared to macrocell BSs whose installation is planned by service providers. A third reason is that it will be more difficult to directly control femtocell BSs than macrocell BSs.

Conventional studies on control of interference from femtocells are classified into techniques for using a different frequency band from a macrocell or a neighbor femtocell for a femtocell and techniques for adaptively controlling the power of a femtocell BS or a user.

Another technique for mitigating interference caused by femtocells is to discontinue signal transmission of a femtocell BS under circumstances. For example, a femtocell BS installed at home or in an office may have no users to serve in a specific time zone of the daytime or the night. If the femtocell BS continues to transmit a pilot signal nonetheless, another BS and an MS that measure interference using a pilot signal use only limited resources even though they are capable of using higher power or a wider bandwidth. This is called a pilot pollution problem.

To avert the pilot pollution problem, a method for optimizing a cell size by controlling transmission power has been proposed. However, this method is an approach to increasing spatial reuse, rather than a solution to pilot pollution. The Long Term Evolution (LTE) or Mobile WiMAX standardization organization interested in the femtocell technology clarifies an inactive mode (e.g. idle mode) for a femtocell BS in a standard, without specifying an algorithm for solving the pilot pollution problem.

Hereinbelow, the active/inactive mode of a femtocell BS designed to solve the pilot pollution problem and femto BS/UE deadlock resulting from the active/inactive mode of the femtocell BS will be described.

An additional description will be given of embodiments of the present invention to solve the femto BS/UE deadlock problem.

SUMMARY OF THE INVENTION

Accordingly, the present invention is directed to a femto Base Station (BS) for reducing Inter-Cell Interference (ICI) and a method for transmitting a signal using the same that substantially obviate one or more problems due to limitations and disadvantages of the related art.

An object of the present invention is to provide a signal transmission method for reducing ICI in a femto BS.

Another object of the present invention is to provide a femto BS for reducing ICI.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a signal to reduce ICI at a femto BS includes determining whether there is a UE within an area of the femto BS, determining whether the UE is in an active mode, operating in a first mode of alternating a first Available Interval (AI) with a first UnAvailable Interval (UAI) in time, if no UE exists within the area of the femto BS, the first AI being an interval in which the femto BS transmits a signal and the first UAI being an interval in which the femto BS does not transmit a signal, operating in a second mode of alternating a second AI with a second UAI shorter than the first UAI in time, if a UE exists within the area of the femto BS and operates in an inactive mode, the second AI being an interval in which the femto BS transmits a signal and the second UAI being an interval in which the femto BS does not transmit a signal, and operating in a third mode of continuously transmitting a signal, if a UE exists within the area of the femto BS and operates in the active mode.

Information about a location of the UE may be received from a core network tracking a paging group Identifier (ID) of the UE. A node of the core network tracking the paging group ID of the UE may be a Radio Network Controller (RNC). Information about UEs that can access the femto BS and a paging group ID of an area in which the femto BS is located may be transmitted to a Femto GateWay (FGW) or a Femto Management System (FMS), so that the RNC may notify the femto BS of movement of a UE that can access the femto BS into the area of the femto BS.

The inactive mode of the UE may include an idle mode.

In another aspect of the present invention, a femto BS for reducing ICI includes a processor for determining whether there is a UE within an area of the femto BS, determining whether the UE is in an active mode, controlling the femto BS to operate in a first mode, if no UE exists within the area of the femto BS, controlling the femto BS to operate in a second mode, if a UE exists within the area of the femto BS and operates in an inactive mode, and controlling the femto BS to operate in a third mode of continuously transmitting a signal, if a UE exists within the area of the femto BS and operates in the active mode, and a transceiver for transmitting a signal in one of the first, second and third modes determined by the processors. The transceiver transmits a signal in a pattern of alternating an AI with an UAI in time, the AI being an interval in which the transceiver transmits a signal and the UAI being an interval in which the transceiver does not transmit a signal, and the UAI is shorter in the second mode than in the first mode.

The processor may receive information about a location of the UE from a core network tracking a paging group ID of the UE. A node of the core network tracking the paging group ID of the UE may be an RNC. The femto BS may further include an Internet communication module for transmitting information about UEs that can access the femto BS and a paging group ID of an area in which the femto BS is located to an FGW or an FMS.

The inactive mode of the UE may include an idle mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that an Institute of Electrical and Electronics Engineers (IEEE) 802.16 system is being used. However, the description is applicable to any other mobile communication system except for specific features inherent to the IEEE 802.16 system.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "User Equipment (UE)" generically refers to a mobile or fixed user terminal device such as a terminal, a Mobile Station (MS), a Personal Computer (PC), etc.

Figure 1:
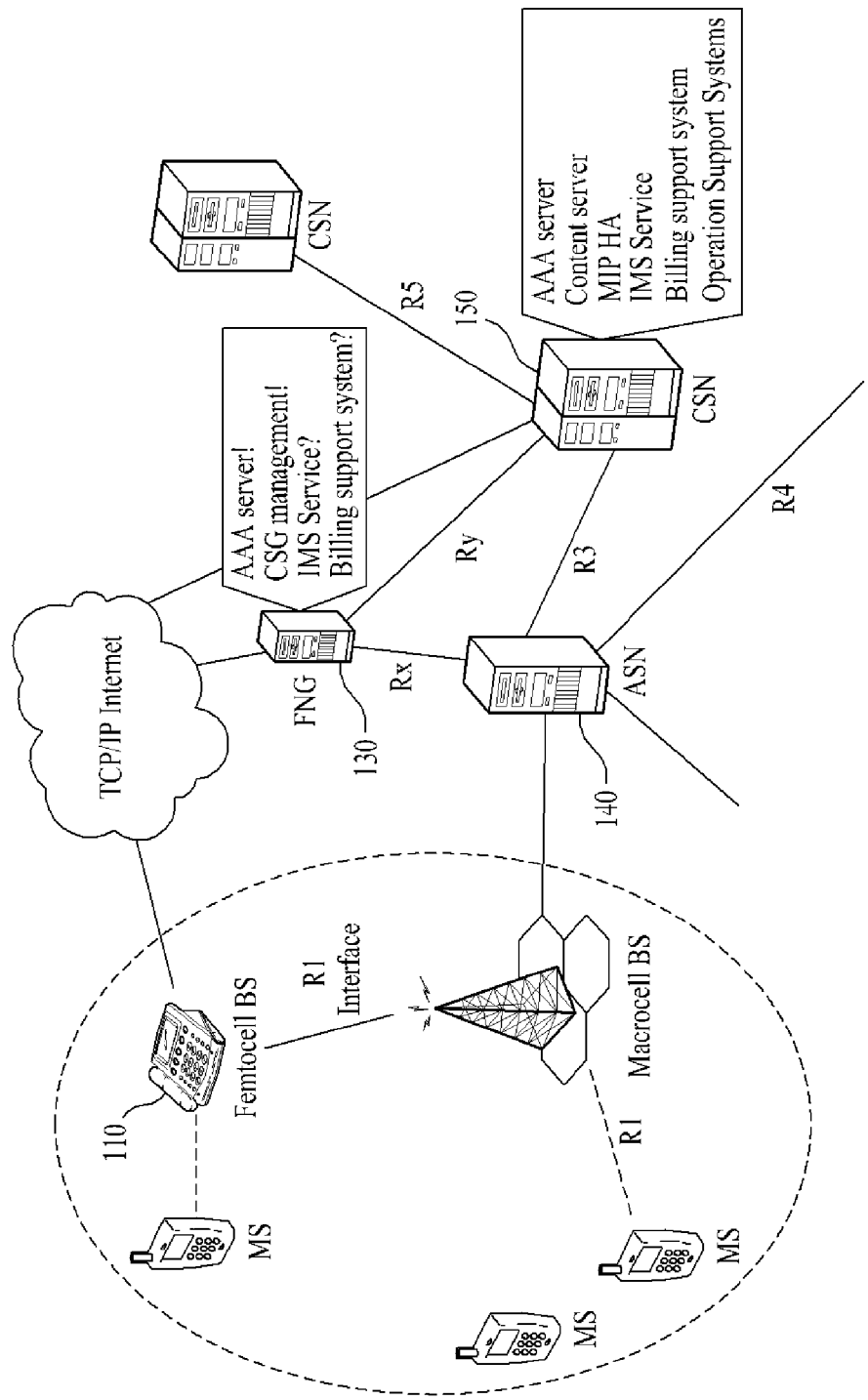
FIG. 1 illustrates the configuration of a wireless communication system to which a femto Base Station (BS) is added.

For the sake of simplicity of description, a simplified architecture of the femtocell network illustrated in FIG. 1 will be described.

Figure 2:
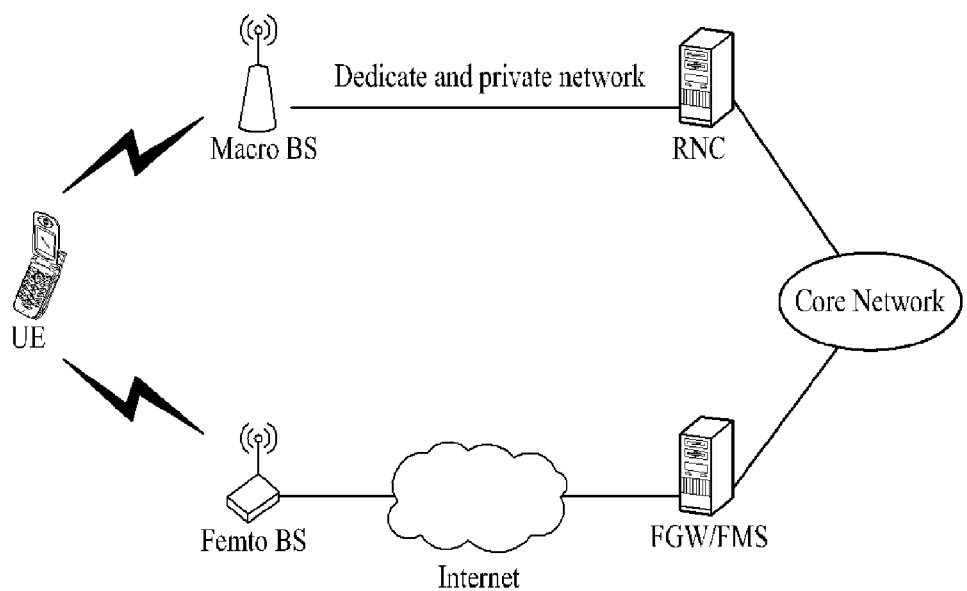
FIG. 2 illustrates a femtocell architecture proposed by the Femto Forum.

FIG. 2 illustrates a femtocell architecture proposed by the Femto Forum.

Referring to FIG. 2, a big feature of the femtocell architecture lies in that a femto BS accesses a backbone network using a wired Internet installed at home, such as an x-Digital Subscriber Line (xDSL) or a cable Modulator-Demodulator (MODEM). Therefore, a system operator that deploys femtocells does not need to pay for the backbone network. However, the femtocells are more vulnerable to data security attacks due to the use of the private Internet. Moreover, centralized management is difficult for femto BSs, compared to macro BSs using a legacy private network.

It is assumed that the system operator employs a Femto GateWay (FGW) and a Femto Management System (FMS) to overcome the drawbacks of femtocells. The FGW may be regarded as performing all or part of the functions of the FNG 130 and the FMS may be regarded as performing all or part of the functions of the ASN 140 and the CSN 150 in the network illustrated in FIG. 1. That is, the FMS manages control data transmitted between femto BSs or received from a center, and the FGW uses IPSec between it and a femto BS. The FGW and the FMS are distinguished according to their functions and may be incorporated into one device. Communication with a femto BS through the FGW/FMS is conducted over a commercial Internet and thus it may be difficult to control the femto BS at the level of tens of milliseconds, like a conventional macro BS. However, it is expected to transmit control data in units of tens of seconds even if data communication is conducted over a commercial network.

The above-described femtocell network will worsen interference, compared to a conventional environment because along with the emergence of smaller cells, the distance between BSs is decreased, the positions of femto BSs installed on a user basis cannot be controlled, and there is no explicit communication line between femto BSs.

The active/inactive mode of a femto BS, designed to solve the above-described interference problem will be described below in comparison with the active/inactive mode of a UE.

In a cellular system, a UE can schedule turn-on/off of a radio transceiver to increase its lifetime. On the other hand, a BS gives no regard to energy consumption and thus rarely turns off its radio transceiver, because power is supplied to the BS. However, the present invention defines a state similar to turn-off of a radio transceiver for a femto BS in order to reduce network interference in a femtocell network.

States where a UE and a femto BS are active and inactive may be referred to as active mode and inactive mode, respectively. Specifically, a state where the UE keeps its radio transceiver turned on is the active mode of the UE and a state where the UE switches between turn-on and turn-off of the radio transceiver to reduce power consumption is the inactive mode of the UE, also called a sleep/idle mode. If a femto BS continuously transmits signals such as a pilot signal, it may be said that the femto BS is in an active mode, whereas the femto BS does not carry out transmission of signals including a pilot signal in an inactive mode in embodiments of the present invention as described later.

The inactive modes of a UE will first be described.

When the UE is not communicating with a BS, the UE typically turns off its radio transceiver and intermittently turns on the radio transceiver to save power. This power saving mode is the inactive mode of the UE, which is further divided into a sleep mode and an idle mode.

The UE is not communicating with a BS, but is still registered to the BS and thus under management of the BS, in the sleep mode, whereas the UE is not registered to any specific BS in the idle mode. Therefore, while the UE is moving, it should change its serving BS through handover in the sleep mode. In the idle mode, the UE can move to another BS without any particular procedure and update its location, when needed.

The idle-mode UE may use a paging group being a set of adjacent BSs to locate itself because there is no serving BS for the idle-mode UE. Even though it does not have transmission data, the idle-mode UE may wake up in every paging cycle and receive broadcast information from a BS. Thus the idle-mode UE may check a paging group ID and the presence or absence of any data directed to it from the broadcast information. When the paging group ID is still the same and there is no data to be received, the UE turns off the radio transceiver until the next paging cycle. If its paging group ID has been changed, the UE may update its location by communicating with the nearest BS. And, if there is any data to be received, the UE may wake up from the idle-mode and receive the data. How much the UE can save power depends on the paging cycle. Because power saving and communication latency are in a trade-off relationship, they need to be appropriately controlled.

The UE cannot perform both transmission and reception in the idle mode. To resume data transmission and reception, the UE should decide on a BS to communicate with and re-start from a ranging procedure. The ranging procedure is slightly different according to whether a user initiates communication or a BS requests communication. In the former case, the UE requests communication to the BS immediately when data communication is needed, whereas in the latter case, the BS should notify the UE of the presence of data to be received when the UE is capable of receiving data according to a paging cycle.

Now a description will be given of the afore-mentioned pilot pollution and the active/inactive mode of a femto BS.

Figure 3:
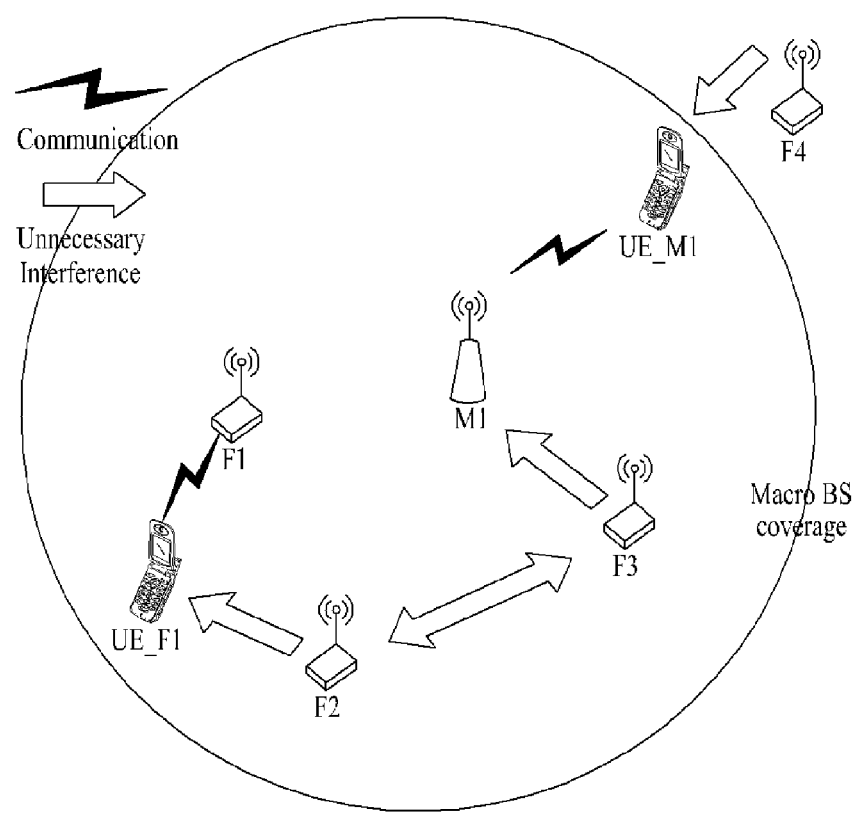
FIG. 3 is a view referred to for describing pilot pollution caused by femto BSs.

FIG. 3 is a view referred to for describing pilot pollution caused by femto BSs.

Referring to FIG. 3, UE_M1 and UE_F1 denote a UE belonging to a macro BS, M1 and a UE belonging to a femto BS, F1, respectively. Femto BSs, F2, F3 and F4 are serving no UEs.

Nevertheless, the femto BSs F2, F3 and F4 transmit pilot signals every 5 ms (in Mobile WiMax), thereby interfering adjacent UEs and neighbor macro/femto BSs. If these femto BSs without users do not perform unnecessary pilot transmission, a macro/femto BS having a user may use higher transmission power or a wider bandwidth and thus network capacity can be increased.

To this end, an inactive state is preferably defined for a femto BS, in which the femto BS discontinues signal transmission for a predetermined time. First of all, the inactive state (mode) of a femto BS is defined simply as a state where the femto BS does not transmit any signal such as a pilot signal, until the concept of the inactive state (mode) is modified later, taking into account femto BS/UE deadlock. One thing to note herein is that the femto BS only discontinues signal transmission, without turning off its radio transceiver in the inactive state. That is, it is assumed that the femto BS can receive a signal even in the inactive state.

As an inactive mode, particularly an UnAvailable Interval (UAI) is defined for a femto BS, interference can be controlled more efficiently. The received SINR of a user is determined by the following equation.

$$SINR = S/(I+N) \qquad \text{[Equation 1]}$$

According to a conventional method for cancelling interference using transmission power, the magnitude of I in [Equation 1] is controlled. Meanwhile, if a femto BS without any user is prohibited from signal transmission, an interference source itself is removed in effect and thus a significant improvement of SINR is expected.

A femto BS/UE deadlock problem which may occur along with the introduction of the above-described inactive state of a femto BS will be described below. While only the idle mode is considered as the inactive mode of a UE, for the sake of convenience, the same thing is applicable to the sleep mode as the inactive mode of a UE. The following description is given in the context of a CSG femto BS, but the same is applicable to an OSG or hybrid femto BS, except that a UE registered to a CSG femto BS is to be serviced by the CSG femto BS.

Figure 4:
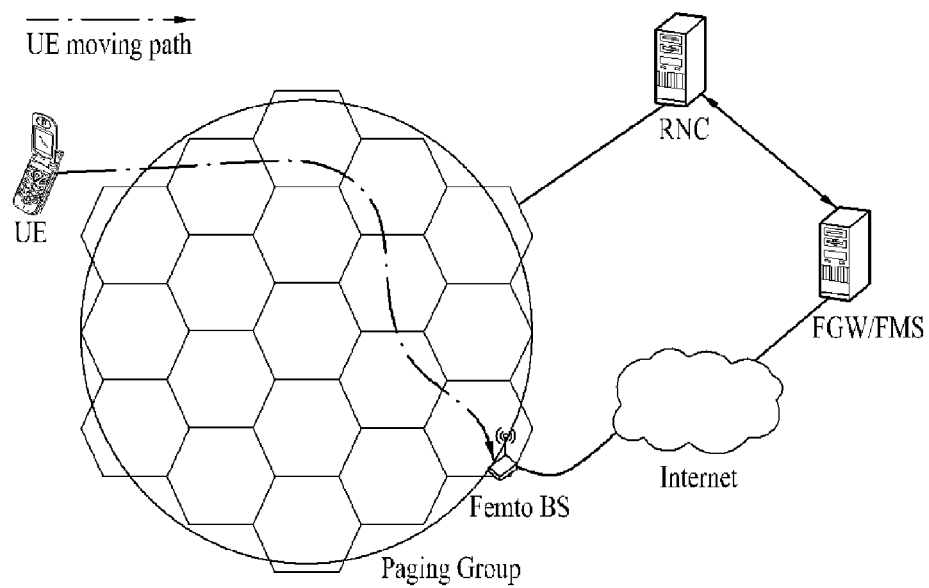
FIG. 4 illustrates a case where a User Equipment (UE) accesses the femtocell of a femto BS installed at home.

FIG. 4 illustrates a case where a UE accesses the femtocell of a femto BS installed at home.

When the UE is in the idle mode, the location of the UE may be managed by a paging group including a plurality of cells, as illustrated in FIG. 4. If the UE approaches a femtocell through a paging group, the UE may need to update its location to a femto BS managed as another paging group. In FIG. 4, the femto BS is connected to an FGW/FMS through the Internet and a paging group including a plurality of cells is managed by a Radio Network Controller (RNC). As illustrated in FIG. 4, the RNC may exchange signals with the FGW/FMS.

Before an active/inactive state is defined for a femto BS according to the present invention, when a UE moves into the coverage area of a femto BS, only two cases, that is, the active and inactive states of the UE have to be considered. However, as an active/inactive state is defined for a femto BS according to the present invention, when a UE moves into the coverage area of a femto BS, four cases may be considered.

If the inactive state of a UE is confined to the idle mode of the UE as described before, the location of the UE is managed at the level of a serving BS in a non-idle mode and at the level of a paging group in the idle mode. On the other hand, if the active/inactive mode of a femto BS is additionally defined, the following four cases should be considered.

1. Active mode of femto BS & active mode of UE: the UE needs to change its serving cell to the femto BS by continuing communication seamlessly through normal handover.

2. Active mode of femto BS & idle mode of UE: since the femto BS is managed as a paging group other than the paging group of a macro BS sharing the same area with the femto BS, a location update is needed to thereby change the paging group of the UE to the femto BS.

3. Inactive mode of femto BS & active mode of UE: the femto BS can receive a signal in the inactive mode, compared to the idle mode of the UE. Therefore, the femto BS is able to find out that the UE is communicating with a macro BS. When the femto BS recognizes that the UE is approaching the femto BS, the femto BS needs to transition to the active mode, perform handover, and provide a communication service to the UE.

4. Inactive mode of femto BS and idle mode of UE: because the two entities are inactive, each of the entities cannot be aware of the existence of the other entity. Thus, either of the entities needs to enter the active mode and notify the other entity of its presence, so that the UE may update its location to the femto BS.

In the first three cases out of the four cases, the UE can easily perform handover to the femto BS or change its paging group without a significant modification to the conventional standards. However, in the fourth case, the user may not be serviced by the femto BS, in spite of the installation of the femto BS. Especially when the femto BS has been installed in a shadowing area and the idle-mode UE enters the home having the femto BS, the UE cannot receive paging-related information and thus continuously scans pilots in all frequency bands. More specifically, in Mobile WiMAX, when the UE has lost a paging sequence, it scans pilot signals from neighbor BSs by activating its radio transceiver. In this situation, the femto BS also awaits only signal reception. As a consequence, the femto BS and the UE may come to a deadlock. This problem is called a femto BS/UE deadlock.

Now a description will be given of embodiments of the present invention for solving the femto BS/UE deadlock problem.

To avert the femto BS/UE deadlock, there is no other way but for either of the two entities to be released from the inactive state, to wake up the other entity by signal transmission, and then to initiate communication.

Three specific embodiments of this method will be described below.

1) UE-Based

In this embodiment, the idle-mode UE wakes up in every paging cycle and transmits a wake-up message to the femto BS in the inactive state in order to wake up the femto BS. Because the femto BS does not still need to transmit a pilot signal, unnecessary interference can be minimized.

Despite the advantage of the minimized interference, this method requires changing the specification of the UE. Moreover, the UE is not aware whether it is within the coverage area of the femto BS and thus the UE should transmit the wake-up message from time to time even though it is in the idle mode. As a result, the battery consumption of the UE is increased, which makes it difficult to actually implement this method.

2) Femto BS-Based

Even though the femto BS is in the inactive state, it transmits a pilot signal from time to time. The femto BS's pilot transmission in the inactive state can be performed by setting an Available Interval (AI) and an UnAvailable Interval (UAI) alternately in time. The femto BS is allowed to transmit a signal in the AI and is not in the UAI. The mode of alternating an AI with a UAI for the femto BS is referred to as a low-duty mode.

Figure 5:
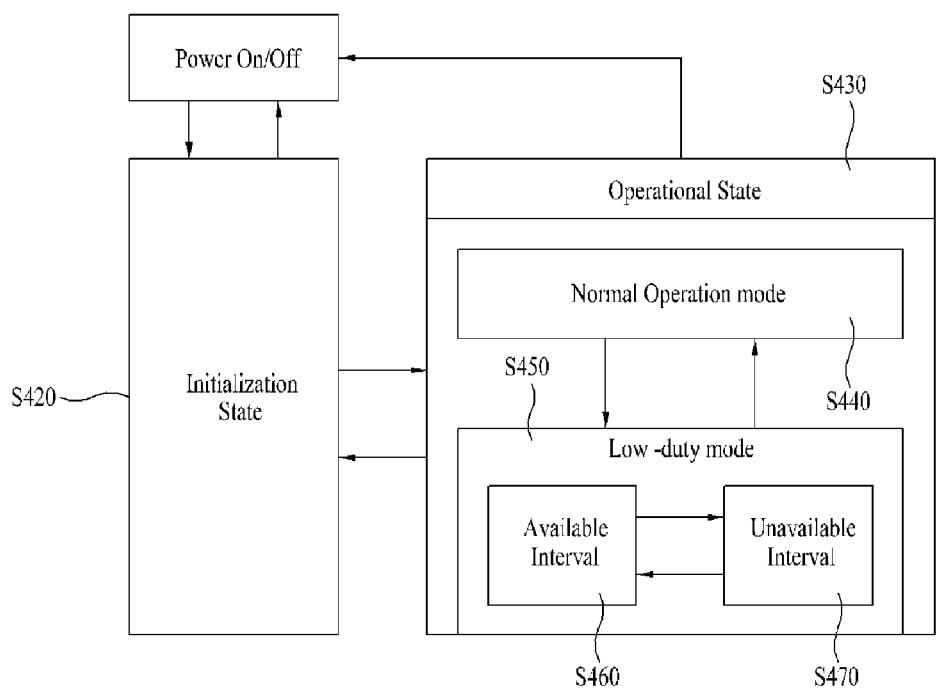
FIG. 5 is a state transition diagram illustrating operation states (modes) of a femto BS according to an embodiment of the present invention.

FIG. 5 is a state transition diagram illustrating operation states (modes) of a femto BS according to an embodiment of the present invention.

Referring to FIG. 5, the femto BS may transition from one state (mode) to another state (mode) during operation. When it is powered on, the femto BS may be placed in an initialization state (S420). In the initialization state, the femto BS may perform procedures including configuration of radio interface parameters, acquisition of time/frequency synchronization, etc.

After accessing a core network of a service provider through synchronization with a macro BS, the femto BS may enter an operational state (S430). If the femto BS is disconnected from the network of the service provider or an operation requirement is not satisfied, for example, due to a synchronization error, the femto BS may return to the initialization state (S420).

In this embodiment, it is preferred to further branch the operational state (S430) into a normal operation mode (S440) as the active mode of the femto BS and a low-duty mode (S450) as the inactive mode of the femto BS, according to whether there is any UE that is connected to the femto BS and any UE that attempts to enter the femto BS. In the low-duty mode, the femto BS reduces a radio interference operation in order to reduce ICI. The femto BS may repeat an AI (S460) and an UAI (S470) over time in the low-duty mode.

In this embodiment, the femto BS may transmit a pilot signal during in the AI even in the low-duty mode. Upon receipt of the pilot signal, an idle-mode UE can determine that it is within the coverage area of the femto BS. Thus the UE may recognize that its paging group has been changed by receiving control data from the femto BS. Therefore, the UE changes the paging group from a macro BS to the femto BS through signaling and the femto BS may transition to an awake state.

Despite the advantage of solving the femto BS/UE deadlock problem, this method cannot shorten a pilot transmission period to or below a specific value to ensure the Quality of Service (QoS) of a UE because there is no knowledge of the time the UE will enter a femto BS.

Interference reduction of a femto BS and entry of an idle-mode UE into the femto BS are in a trade-off relationship. How often to transmit a pilot signal should be determined, taking into account the trade-off relationship.

Figure 6:
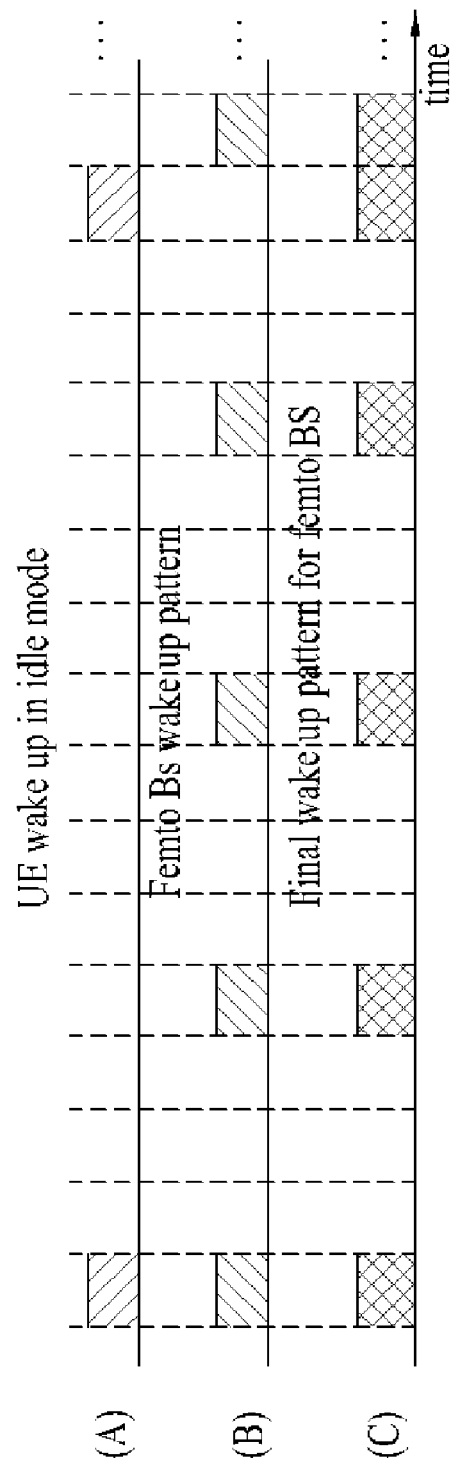
FIG. 6 is a view referred to for describing a pilot transmission period of the femto BS according to an embodiment of the present invention.

FIG. 6 is a view referred to for describing a pilot transmission period of a femto BS according to an embodiment of the present invention.

(A) of FIG. 6 represents a pattern in which an idle-mode UE wakes up in every paging cycle and (B) of FIG. 6 represents a pattern in which a femto BS transmits a signal such as a pilot signal in a basic low-duty mode. In order to prevent the femto BS/UE deadlock when an idle-mode UE enters the femtocell, all intervals in which the UE wakes up in the pattern (A) and all transmission intervals of the femto BS in the femto BS wakeup pattern (B) are preferably set as AIs, as illustrated in (C) of FIG. 6.

3) Femto BS-Based (Core Network-Assisted)

This embodiment of the present invention is devised to minimize the suppression of interference reduction that the second embodiment faces due to a femto BS's transmission of a pilot signal during AIs in every paging cycle in a low-duty mode to reduce ICI. For this purpose, the low-duty mode of the second embodiment is set differently in case (1) where there is no UE within the area of the femto BS, and case (2) where there is a UE within the area of the femto BS but the UE is in the idle mode (the inactive mode). A UAI is set to be shorter (to occur less often) in case (2) than in case (1).

Figure 7:
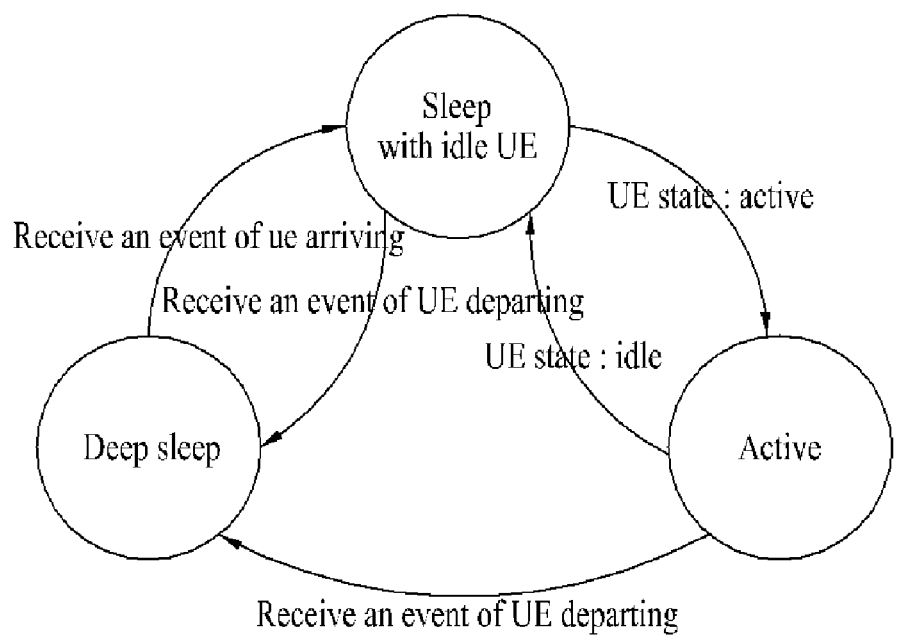
FIG. 7 illustrates operation modes of the femto BS according to an embodiment of the present invention.

FIG. 7 illustrates operation modes of a femto BS according to an embodiment of the present invention.

Referring to FIG. 7, a "Deep sleep" mode refers to a state in which the femto BS uses a long pilot transmission period, that is, a long UAI on the assumption that there is no UE within or in the vicinity of the femto BS. A "Sleep with idle mode UE" mode refers to a state in which an idle-mode UE is located within the area of the femto BS and the femto BS transmits a pilot with a period long enough to satisfy the QoS of the UE, while the femto BS operates in a UAI during the remaining time. That is, the low-duty mode of the femto BS is divided into two modes and the femto BS is allowed to perform minimum pilot transmission according to the modes, thereby minimizing interference to the network in the embodiment of the present invention. Specifically, a shorter UAI is set for the femto BS in the "Sleep with idle UE" mode than in the "Deep sleep" mode, to thereby solve the femto BS/UE deadlock problem and minimize the pilot pollution problem.

In this embodiment, the femto BS acquires from a core network information indicating whether a UE has approached or moved out of the coverage area of the femto BS. Information indicating whether a UE has approached or moved out of the Femto BS coverage area can be acquired by using a location update procedure of the UE. As illustrated in FIG. 7, upon receipt of information indicating occurrence of the event that a UE has entered the femtocell from the core network in the "Deep sleep" mode, the femto BS may transition to the "Sleep with idle UE" mode. When the UE is then activated, the femto BS may transition to an "Active" mode. If the UE is placed in the idle mode within the coverage area of the femto BS in the "Active" mode, the femto BS may return to the "Sleep with idle UE" mode. When the UE moves out of the femtocell, the femto BS may transition to the "Deep sleep" mode. As illustrated in FIG. 7, if the UE moves out of the femtocell with the femto BS in the "Active" state, the femto BS may transition directly to the "Deep sleep" mode.

Now a description will be given of a method for acquiring information about the location of a UE from a core network in a femto BS. This is a network-assisted scheme.

According to the network-assisted scheme, the core network detects movement of a UE registered to a femto BS into the coverage area of the femto BS and assists the femto BS to wake up by notifying the femto BS of the movement of the UE. If the core network helps the femto BS to locate the UE, the femto BS may lengthen its pilot transmission period when there is no UE within the femtocell of the femto BS.

An algorithm of notifying a femto BS of access of a UE by a network may be divided into an initialization stage and an operational stage.

The initialization stage involves a step of performing settings during self-configuration of a femto BS when the femto BS is installed, a step of registering UEs that can access the femto BS and detecting the paging group ID of the area of a macro BS by receiving a pilot signal from the macro BS by the femto BS, a step of transmitting the acquired information, that is, a served UE list and a macro BS paging group ID to an FGW/FMS. Upon receipt of the information, the FGW/FMS may transmit the received information to the nearest RNC and the RNC may register the ID of the femto BS, the IDs of the UEs, and the neighbor macro BS paging group ID.

Figure 8:
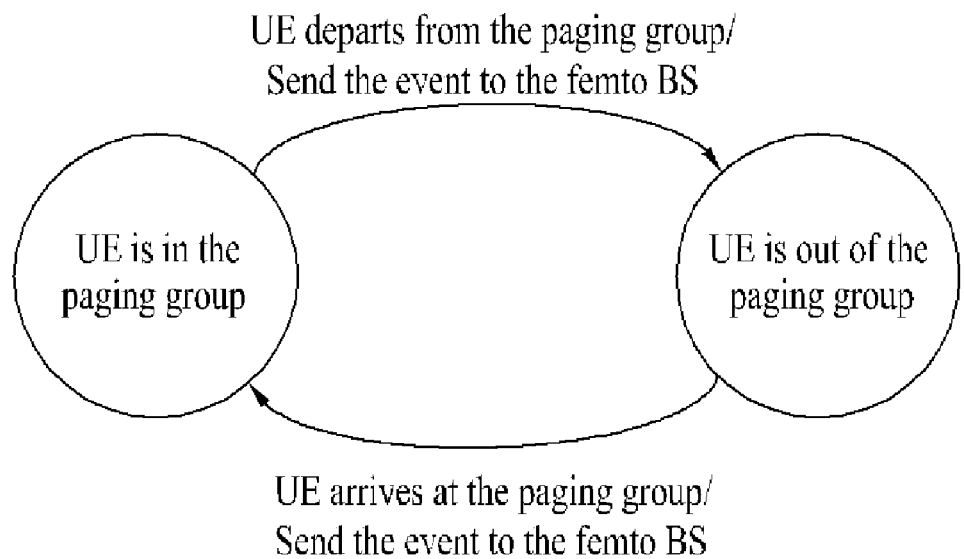
FIG. 8 illustrates an operation method of a Radio Network Controller (RNC) according to an embodiment of the present invention.

FIG. 8 illustrates an operation method of an RNC according to an embodiment of the present invention.

Referring to FIG. 8, the RNC is tracking the paging group ID of an area in which a UE registered to a specific paging group stays. When detecting that the UE has entered the paging group, the RNC may notify a femto BS of the paging group of this event. More specifically, when a UE moves into the paging group of a femto BS identified by the RNC, the RNC may notify the femto BS of the event through an FGW/FMS. When the UE moves out of the paging group of the femto BS, the RNC may also indicate the event to the femto BS.

Upon receipt of information indicating the UE entry event, the femto BS may transition from the "Deep sleep" mode to the "Sleep with idle UE" mode, for the UE. If the UE enters the coverage area of the femto BS, the femto BS performs a paging group changing procedure (a location update procedure). If the UE moves out of the paging group of the femto BS, the RNC notifies the femto BS of the event and thus the femto BS may return to the "Deep sleep" mode.

Because signaling to a femto BS through an FGW/FMS is carried out over a public network in a femtocell environment, it is not easy to determine a latency range strictly. However, recent study results reveal that the control signaling is expected to have a delay of a few seconds in spite of using a public network. On the assumption that a macrocell has a radius of 1 km and a paging group includes a plurality of BSs, a UE may take at least a few minutes to move from the area of a neighbor BS to the area of a femto BS installed at home. Accordingly, the femto BS may have an enough time to transition from the "Deep sleep" mode to the "Sleep with idle UE" mode in the present invention.

In another example, the femto BS may acquire information about the location of a UE without a help of the core network. When a UE enters into the coverage area of the femto BS, the UE may perform a location update procedure to update its location. By using this, the femto BS in a deep sleep mode can acknowledge that the UE has entered its coverage area and change its mode as sleep with idle UE mode. In this case, the above explained latency problem by using the public network can be addressed.

As is apparent from the above description, the present invention can efficiently solve the femto BS/UE deadlock problem as well as the pilot pollution problem.

The present invention is applicable to a variety of wireless communication systems using femto BSs. While the above description centers on an IEEE 802.16 system, by way of example, the present invention is also applicable to other mobile communication systems using femto BSs, such as 3GPP LTE systems.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention.

Accordingly, the invention should not be limited to the specific embodiments described herein, but should be accorded the broadest scope consistent with the principles and novel features disclosed herein.

What is claimed is:

1. A method for transmitting a signal to reduce Inter-Cell Interference (ICI) at a femto Base Station (BS), the method comprising:

determining whether there is a User Equipment (UE) within an area of the femto BS and whether the UE is in an active mode;

operating in a first mode of alternating a first Available Interval (AI) with a first UnAvailable Interval (UAI) in time, if no UE exists within the area of the femto BS, the first AI being an interval in which the femto BS transmits a signal and the first UAI being an interval in which the femto BS does not transmit a signal;

operating in a second mode of alternating a second AI with a second UAI in time, if the UE exists within the area of the femto BS and operates in an inactive mode, the second AI being an interval in which the femto BS transmits a signal and the second UAI being an interval in which the femto BS does not transmit a signal, the second UAI being shorter than the first UAI;

operating in a third mode of continuously transmitting a signal, if the UE exists within the area of the femto BS and operates in the active mode; and transmitting information about UEs that can access the femto BS and the paging group ID of an area in which the femto BS is located to a Femto GateWay (FGW) or a Femto Management System (FMS) such that a Radio Network Controller (RNC) notifies the femto BS of movement of a UE, that can access the femto BS, into the area of the femto BS, wherein information about a location of the UE is acquired from a core network tracking a paging group Identifier (ID) of the UE, and wherein a node of the core network tracking the paging group ID of the UE is the RNC.

2. The method according to claim 1, wherein information about a location of the UE is acquired by a location update procedure of the UE.

3. The method according to claim 1, wherein the inactive mode of the UE includes an idle mode.

4. A femto Base Station (BS) for reducing Inter-Cell Interference (ICI), the femto BS comprising:

a processor configured for determining whether there is a User Equipment (UE) within an area of the femto BS and whether the UE is in an active mode, controlling the femto BS to operate in a first mode, if no UE exists within the area of the femto BS, controlling the femto BS to operate in a second mode, if the UE exists within the area of the femto BS and operates in an inactive mode, and controlling the femto BS to operate in a third mode of continuously transmitting a signal, if the UE exists within the area of the femto BS and operates in the active mode;

a transceiver for transmitting a signal in one of the first, second and third modes determined by the processors; and an Internet communication module for transmitting information about UEs that can access the femto BS and the paging group ID of an area in which the femto BS is located to a Femto GateWay (FGW) or a Femto Management System (FMS), wherein the transceiver transmits the signal in a pattern of alternating an Available Interval (AI) with an UnAvailable Interval (UAI) in time, the AI being an interval in which the transceiver transmits the signal and the UAI being an interval in which the transceiver does not transmit the signal, and the UAI is shorter in the second mode than in the first mode, wherein the processor receives information about a location of the UE from a core network tracking a paging group Identifier (ID) of the UE, and wherein a node of the core network tracking the paging group ID of the UE is a Radio Network Controller (RNC).

5. The femto BS according to claim 4, wherein the processor acquires information about a location of the UE by a location update procedure of the UE.

6. The femto BS according to claim 4, wherein the inactive mode of the UE includes an idle mode.

* * * * *

UNITED STATES PATENT AND TRADEMARK OFFICE
CERTIFICATE OF CORRECTION

| | | |
|---|---|---|
| PATENT NO. | : 8,260,270 B2 | Page 1 of 1 |
| APPLICATION NO. | : 13/028706 | |
| DATED | : September 4, 2012 | |
| INVENTOR(S) | : Yoon et al. | |

It is certified that error appears in the above-identified patent and that said Letters Patent is hereby corrected as shown below:

On the Face Page, in Field (74), under "Attorney, Agent or Firm", in Column 2, Line 1, delete "Maschoff Filmore & Israelsen" and insert -- Maschoff Gilmore & Israelsen --, therefor.

Signed and Sealed this
Sixth Day of November, 2012

David J. Kappos
*Director of the United States Patent and Trademark Office*